Oct. 13, 1964  R. J. JONES  3,152,419
CRADLED FISH LURE
Filed March 23, 1962

RUFUS J. JONES
INVENTOR.

BY 3,152,419
CRADLED FISH LURE
Rufus J. Jones, Dallas, Tex.
(579 W. Shelby Drive, Memphis 9, Tenn.)
Filed Mar. 23, 1962, Ser. No. 181,873
4 Claims. (Cl. 43—42.03)

This invention relates to fishing tackle and in a more particular aspect to fishing lure devices.

It is customary for most anglers who are devoted to the sport of fishing to use an artificial lure to attract fish. Lures may be so made that they float normally on the surface of the water, but when pulled by the angler as when trolling, they run below the surface. The lure may also bob and duck when jerked by the angler in a manner calculated to attract fish. Many anglers prefer a type of lure which emits a sound while ducking and bobbing and when running below the surface of the water.

Consequently, it is the general object of the present invention to provide an improved artificial fishing lure device.

Another object of the present invention is to provide an improved fishing lure which, when pulled, intermittently emits sounds as it bobs and ducks on the surface of the water.

Another object of the present invention is to provide a fishing lure which, when pulled steadily, runs below the water surface and emits sounds.

In accordance with the present invention, there is provided a fishing lure which includes a body with a cradle surrounding in spaced relation the lower forward quadrant of the body. The cradle preferably includes a forwardly and downwardly extending tongue. A first loop, lying in the vertical longitudinal plane of the body, extends forwardly from the body and is loosely linked to the cradle. A transverse yoke spans the underside of the body and is provided with a downwardly extending loop which lies in the plane of the first loop. The upper ends of the yoke are secured to the body by a pair of fasteners lying in a horizontal plane of symmetry. The fasteners are positioned so that they alternately strike the sides of the cradle as the body and the cradle oscillate one relative to the other.

These and other objects are effected by the present invention as will be apparent from the following description taken in accordance with the accompanying drawing in which.

Figure 1:
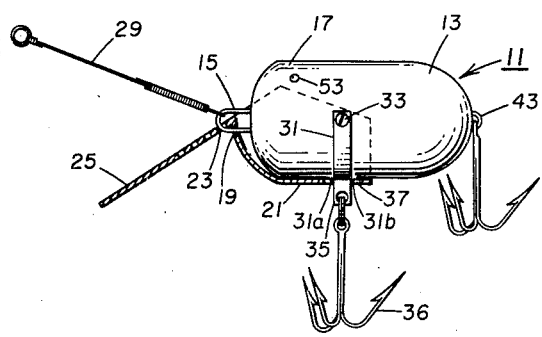
FIGURE 1 is an elevational view of a fishing lure device, partially in section, constructed in accordance with a preferred embodiment of the invention.

Referring now to FIGURE 1, the fishing lure 11 includes a plug body 13, which may have any convenient and desirable form. A loop 15 lying in a vertical plane passing longitudinally through the plug body 13 extends axially from the front end 17 of the body 13 and is loosely linked through a hole 19 in a cradle 21. The cradle 21 is conformable to, but is spaced from, the front lower region of the plug body 13. The loop 15 is loosely linked, also, through holes 23 in a tongue 25 which is formed integrally with and at the upper front end of the cradle 21. The loop 15 is staple-shaped, having both legs embedded in the body 13 to prevent rotation axially out of the longitudinal plane.

The tongue 25 extends forwardly and downwardly as to cause the lure to submerge immediately when it is pulled forward. While the tongue 25 has a trapezoidal shape, as shown, it is evident that it may have any convenient shape and size as long as it leads generally forward and downward and is not disproportionately large.

A series of holes, of which hole 27 is one, are arranged at spaced intervals in the tongue along a median line thereof. The holes provide for connection at convenient locations of a leader 29 which is attached in any suitable manner to the end of a fishing line (not shown). As shown in FIGURE 1, the leader 29 may be directly attached to loop 15.

A transverse yoke 31 spans the underside of the plug body 13 in confronting relation. The upper ends of the yoke 31 are secured to the plug body by a pair of fasteners, such as screws, having integrally formed, outwardly projecting heads 33 which serve as hammers. In the preferred embodiment, the hammer heads 33 lie in the horizontal axial plane of the body 13 and are in close proximity to the side of the cradle 21. The yoke is restrained in position by stops 31a and 31b positioned on the underside of the body 13. Another loop or link 35, lying in the longitudinal plane of the body 13 and in the same plane as the first loop 15, extends downwardly below the yoke 31 through an aperture 37 in the cradle 21. A gang-type or other suitable hook 36 is attached to the loop or link 35. The attachment means for the hook 36 also serves as key means to pass through loop 35 and restrain the downward motion of the cradle 21.

At the rear end of the plug body 13, there is another gang-hook or other suitable hook 41, which is loosely connected to the body by a staple 43 or other convenient type of fastener.

In the preferred embodiment, the forwardly extending link 15 is connected loosely to the tongue 25 and the cradle 21 so as to lie in the longitudinal vertical plane of the body 13. Likewise, the body 13 is connected loosely to the cradle 21 by the downwardly projecting loop or link 35 which lies, also, in the longitudinal vertical plane of the body. It has been found highly desirable to maintain this co-planar relation between the loops 15, 35. When so maintained, the body 13 is free to move laterally about the frontal connection and pivotally about the bottom connection. Whether the body moves laterally or pivotally or in a manner combining both movements, the hammer heads 33 strike intermittently the cradle, producing sounds which are transmitted through the water.

As mentioned hereinbefore, when the body is pulled along at a fairly uniform rate of speed, as when trolling, the water strikes the downwardly extending tongue and produces a force which causes the body to submerge. It is evident that the combination of the slope of the tongue, the speed of forward movement and the location where the leader is attached, determines the distance below the surface at which the plug body will run.

The loop 15 and the staple 43 may, if desired, be formed from a single length of rod or wire which extends through the body 13. Furthermore, if desired, eyes may be simulated on the upper surface of the body as indicated in zones 53, 54.

Figure 3:
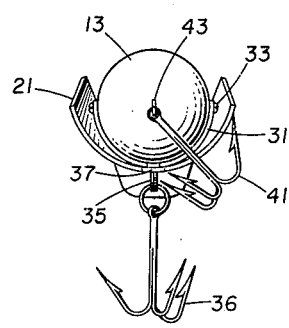
FIGURE 3 is a rear end view of the embodiment of FIGURE 1.
Figure 2:
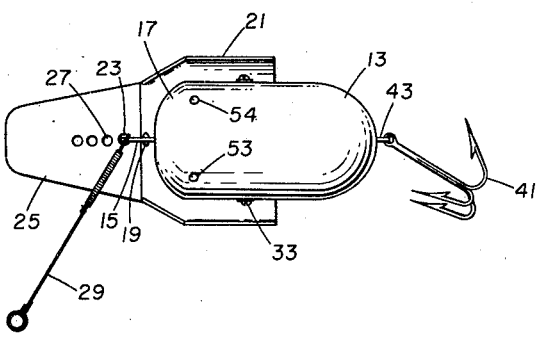
FIGURE 2 is a plan view of the embodiment of FIGURE 1.
Figure 4:
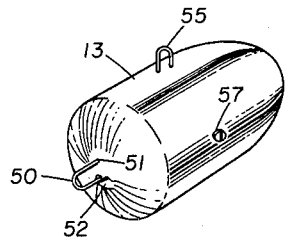
FIGURE 4 is a perspective bottom-up view of a modification of the invention of FIGURE 1.

In FIGURE 4 a modification of the invention is shown, bottom side up. A loop 50 may have one end screwed into the body 13 at the point 51. The loop 50 performs the same function as the loop 15, and, therefore, lies preferably in the longitudinal vertical plane of the body 13. The free end of the loop 50 is open to permit connection to the cradle 21 and tongue 25. When connection is made, the free end of the loop 50 rests in the socket formed in the detent 52. This socket serves to secure the free end so as to maintain the loop 50 and the longitudinal vertical body 13. As shown, also, in FIGURE 4, a loop 55 is attached to the underside of the body 13 to form the same function as the loop 35 of FIGURES 1–3.

As shown in FIGURE 4, the loop 55 lies in the same plane as loop 50 and is disposed to project downwardly through the aperture 37 in the cradle 21. Screws 57 having integral heads form hammer-like protuberances on the surface of body 13. Hammers 57 are positioned on the body 13 at points in close proximity to the cradle 21. To be most effective, the hammers preferably lie in a horizontal median plane of the body 13. They are intermittently struck by the cradle 21 which emits sounds as the lure travels through the water.

Those skilled in the art will recognize that the body 13 may have any desirable shape and any form which may be preferred by the individual angler. So too, the body, the cradle, the yoke and the other elements may be constructed of metal, wood, plastic, ceramics, or any suitable substance formed to function in the general manner described and shown herein.

Thus, it is evident that the invention is characterized by a floatable plug body loosely connected to a cradle partially surrounding a portion of the body at points of symmetry. With respect to such points of symmetry, the body moves laterally and pivotally to strike the cradle, causing the latter to emit sounds.

Having described the invention in connection with certain embodiments thereof, it is understood that further modifications may suggest themselves to those skilled in the art and it is tended to cover such modifications as fall within the scope of the appended claims.

What is claimed is:

1. A fish lure comprising:
   (a) a body having symmetry with respect to a vertical plane,
   (b) a cradle surrounding in spaced relation the lower forward quadrant of said body and including a forwardly and downwardly extending tongue with an aperture at a forward point on said tongue and a slot in the bottom of said cradle at the intersection of said cradle and said plane,
   (c) a first loop secured to and extending forwardly from said body and loosely linked to said cradle in said aperture to permit said cradle to rock alternately toward either side of said body,
   (d) a second loop secured to and extending downwardly from said body and projecting loosely through said slot,
   (e) linkage means in said second loop for coupling a hook to said body for retaining said cradle adjacent to said body, and
   (f) contact elements carried on the sides of said body alternately to contact the sides of said cradle as said cradle rocks relative to said body.

2. A fish lure comprising:
   (a) a main frame having side portions,
   (b) a cradle having side portions spaced from said side portions of said main frame and having a medial slot,
   (c) a first planar loop at one end of said main frame,
   (d) loose coupling structure forming a part of said cradle and engaging said first planar loop to permit said cradle to oscillate horizontally with respect to said main frame,
   (e) a second planar loop lying in the plane of said first loop and attached to said main frame to project loosely through said slot,
   (f) key means coupled to said second loop outside said cradle to retain said cradle from moving below a predetermined vertical spaced relationship with respect to said main frame,
   (g) hammers on said main frame positioned to intermittently contact opposite sides of said cradle as said cradle oscillates relative to said main frame.

3. A fish lure comprising:
   (a) a main frame having side portions,
   (b) a cradle with opposite upstanding sides straddling the lower portion of said main frame and including a bottom under said main frame having a pierced zone, the sides of said cradle being spaced from said side portions,
   (c) a first planar loop at one end of said main frame loosely coupled to said cradle to permit said opposite sides of said cradle to alternately move toward and away from said main frame,
   (d) a second planar loop lying in the plane of said first loop and attached to said main frame and projecting loosely through said pierced zone,
   (e) a hook linked in said second loop, and
   (f) hammer means on said main frame and positioned to intermittently contact the sides of said cradle as said cradle sides alternately move toward and away from said frame when the fish lure is moved submerged through water.

4. A fish lure comprising:
   (a) a cylindrical body,
   (b) a cradle surrounding in spaced realtion the lower forward quadrant of said body and having a forwardly and downwardly extending tongue with a plurality of apertures therein configured along a median line,
   (c) a vertical loop extending forwardly from said body and loosely linked to said tongue to permit opposite sides of said cradle to alternately move toward and away from said body,
   (d) a transverse yoke spanning the underside of said body and having a downwardly projecting tab with an opening through the lower end thereof extending loosely through said cradle, said tab being oriented so that the opening therethrough lies in the same plane as said vertical loop, and
   (e) screws securing said yoke to said body with the heads thereof positioned to contact alternately said cradle as said body and said cradle oscillate one relative to the other when towed from said vertical loop.

References Cited in the file of this patent

UNITED STATES PATENTS

| | | |
|---|---|---|
| 1,345,600 | Keeling | July 6, 1920 |
| 1,723,193 | McLaughlin | Aug. 6, 1929 |
| 2,598,012 | Prieur | May 27, 1952 |